March 23, 1965  R. K. STRAUSS  3,175,032
SPLICE CASES
Filed Sept. 19, 1961  2 Sheets-Sheet 1
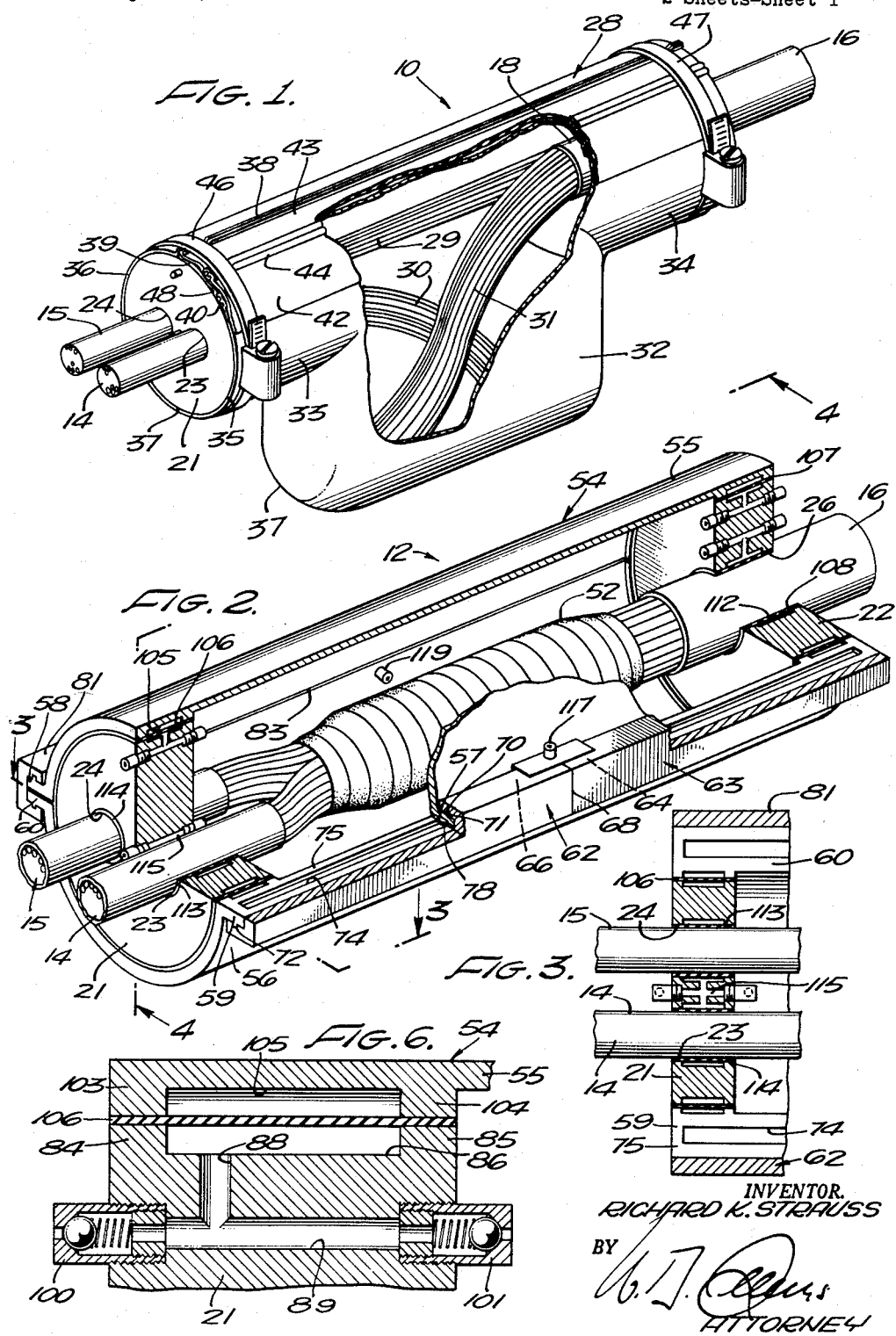
INVENTOR.
RICHARD K. STRAUSS
BY
ATTORNEY March 23, 1965 R. K. STRAUSS 3,175,032
SPLICE CASES
Filed Sept. 19, 1961 2 Sheets-Sheet 2

INVENTOR.
RICHARD K. STRAUSS
BY
ATTORNEY

United States Patent Office 3,175,032
Patented Mar. 23, 1965

3,175,032
SPLICE CASES
Richard K. Strauss, 4728 Gould, La Canada, Calif.
Filed Sept. 19, 1961, Ser. No. 139,173
13 Claims. (Cl. 174—93)

This invention relates to the act of enclosing a cable splice and more particularly to weatherproofing equipment comprising a jacket for temporarily encasing a partially completed cable splice, and to a permanent jacket for installation when the splice has been completed.

Sheathed cables are employed in electrical systems when weatherproofing is an important factor, as for instance, in telephone systems. Conventional weatherproofed cables contain numerous wires insulated from each other and an outside sheat of lead or plastic. In the manufacture of cables of this type, extreme care is exercised to keep the wires dry because moisture in a cable alters its electrical characteristics and causes swelling and other undesirable results. For many installations it is customary to pump dry air or nitrogen into the cable to maintain an internal pressure slightly greater than atmospheric to prevent entry of moisture.

Cable splices must also be protected from moisture and this is accomplished by the use of splice cases. In the work of installing cables and making cable splices it often occurs that the first connecttion of cable wire is made long before the last, there being intervals of hours and sometimes days between operations of making connections. It is important that both the connected ends and the loose ends of cable wires be protected from moisture, from the time of making the first connection of wires to the last.

It is a general object of this invention to provide splice casing equipment having parts for protecting a partially completed cable splice during those intervals of time between operations of making wire connections, and having other parts of utility not only for temporary splice case purposes but also to serve as elements of a permanent splice case for a completed cable splice.

The equipment of this invention is characterized by the fact that it includes certain elements of temporary utility and others of permanent utility, certain of the permanent elements being employed both in a temporary capacity for weatherproofing a partially completed cable splice, and thereafter in a permanent capacity as parts of a permanent casing for weatherproofing a completed cable splice. Employment of certain parts both for temporary and permanent installation purposes affords the advantages of economy in a number of parts and in work time. Using equipment of this invention, a telephone linesman, for example, need equip himself with a supply of a relatively small number of parts for making cable splices of various sizes.

Another object of this invention is the provision of a temporary jacket of water-impermeable material for encasing both the completed wire connections and loose wire ends of a partially formed cable splice, the jacket fitting fluid tight around end walls of a permanent splice case which includes a permanent jacket for the completed cable splice adapted to fit fluid-tight around said end walls and to contain gas under pressure greater that atmospheric.

Another object of this invention is to provide a permanent splice case of the above-mentioned character and having fluid pressure-acted diaphragms for sealing the splice case around lengths of cable spliced together and around the above-mentioned casing end walls.

A general object of this invention is to provide apparatus of the above-mentioned character which is simple in construction, simple and easy to install and to disassemble, reliable in operation, and economic to manufacture.

These and other more specific objects will appear upon reading the following part of this specification and claims and upon considering in connection therewith the attached drawings to which they relate.

Referring now to the drawings in which a preferred embodiment of the invention is illustrated.

FIGURE 1 is a perspective view of a temporary case of this invention, enclosed a partially completed cable splice, the case being cut away in part to expose connected wires and loose wire ends to be connected;

FIGURE 2 is a perspective view of a permanent splice case of this invention, enclosing a completed cable splice, the case being cut away partially in longitudinal section;

FIGURE 3 is a cross-section on an enlarged scale through an end portion of the permanent case of FIGURE 2, and taken upon line 3—3 of FIGURE 2;

FIGURE 6 is a detail section through one of the seals of the case of FIGURE 2;

Figure 4:
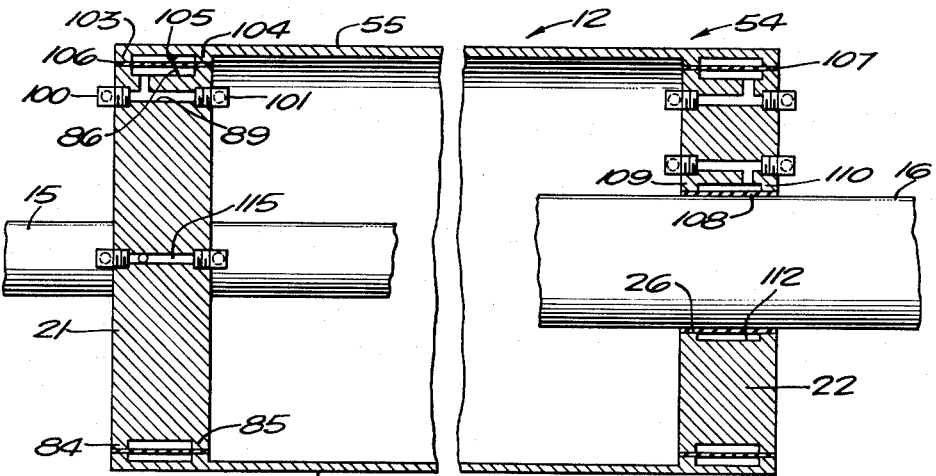
FIGURE 4 is a central longitudinal section through the permanent case of FIGURE 2 taken along line 4—4 of FIGURE 2 and showing certain of the seal diaphragms prior to being expanded to their sealing positions.

The temporary splice case shown in FIGURE 1 is designated generally by reference numeral 10 and the permanent splice case of FIGURE 2 is designated generally by numerial 12. With the aim of illustrating but one example of a typical cable splice which will demonstrate how apparatus of this invention is easily adapted for other types of cable splices, a Y-splice has been chosen having two branch cables 14 and 15 extending through one end of each splice case and a single cable length 16 extending through the other end. The Y-type splice makes obvious the use of the cases for interconnecting two cable lengths end to end and cases for X-type splices.

Cabling of the type contemplated by this invention is normally provided with a continuous sheath 18 of lead or plastics material which will hold an internal pressure of dry air at a few pounds higher than atmospheric pressure. Prior to making connections of wires of one cable with those of another the cable sheathing is stripped back and cut off from the ends of the cables. The individual wires are wrapped with paper or otherwise suitably coated with insulation.

Cables 14 and 15 extend through an end wall 21 and the single cable 16 extends through an end wall 22 which appears in FIGURE 2. These walls are preferably formed of any suitable rigid material. The openings in wall 21 for its cable lengths are numbered 23 and 24, and the opening in wall 22 for cable 16 is numbered 26. Other than the fact that end wall 21 is made to receive two cables while end wall 22 receives but a single cable, the walls are the same in construction. The cable lengths are passed through their respective walls prior to making any connections of conductor wires.

Temporary splice case 10 includes a jacket 28 for covering those wire ends which have been interconnected at 29 and those loose ends 30 and 31 of cable wires not yet interconnected. Jacket 28 is tubular and has an enlargement 32 extending laterally from its midportion as a pocket for receiving the unspliced ends 30 and 31. The tubular end portions 33 and 34 of the jacket are of a size to fit snugly around the end walls 21 and 22 respectively.

The illustrated jacket is formed from two sheets of impervious flexible material as, for example, polyethylene, polyvinylchloride, sheet rubber or any of numerous other materials having generally similar properties. One such sheet is herein referred to as a forward half 35 and the other as a rearward half 36. These are joined together by bonding or heat sealing along a seam 37 which extends longitudinally of the tubular end portions 33 and 34 and downwardly along the opposite ends and the bottom of the pocket 32. Another seam 38, diametrically opposite the seam 37, joins one lateral edge of sheet 36 to a longitudinally extending strip 39.

The free edges of strip 39 and sheet 35 have complementally shaped interlocking tongue-and-groove means 40 adapted to interlock in fluid-tight manner simply by pressing the tongues and grooves into mating relationship either by finger pressure or with a conventional slide fastener closure device. To provide added protection against entry of moisture, jacket 28 has two longitudinally extending flaps 42 and 43 adapted to be joined together along an outer seam 44 of complementally shaped interlocking tongue-and-groove means similar to the seam 40. Flap 42 covers the inner seam 40 and is secured along one side edge to the outside surface of forward sheet 35. Flap 43 is secured throughout one side edge to the sheet 36 and to the strip 39 along the upper seam 38.

The tubular end portions 33 and 34 fit snugly around the end walls 21 and 22 respectively, and are bound tight around the end walls with band clamps 46 and 47. In order to insure that the jacket fits fluid-tight around the end walls, sealing paste composition may be applied to the inside surface of the jacket especially at the seams 37 and 38 and at the interlocking tongue-and-groove seams 40 and 44. Numeral 48 designates a space which is contiguous the tongue-and-groove seam 40 where the inside surface of the jacket is raised slightly above the peripheral surface of the end wall 21, the space 48 being specially mentioned as an example of other similar spaces. When sealing paste is filled in these spaces and the band clamps are tightened, the temporary jacket 28 will be sealed fluid tight around the end walls.

As thus far described, it will be apparent that the jacket 28 serves to encase the partially completed cable splice of FIGURE 1 in which some of the cable wires have been joined together at 29 and others are to be interconnected at a later time. The jacket enables a workman to temporarily cover and weatherproof the partially completed cable splice until it becomes time again to make additional wire connections. It is a simple process to remove the temporary jacket 28, this being done by opening the band clamps 46 and 47 and opening the seams 40 and 44 for removal of the jacket. Additional wire connections are then made and should another interval of non-splicing time be anticipated before completion of the splice, the temporary jacket 28 may be replaced. In each instance of replacement of the temporary jacket, sealing paste is applied around the end walls 21 and 22 for fluid-tight mounting. Inasmuch as the splice cases of this invention will ordinarily be used in wiring installations in which the gas pressure inside a splice case is to be maintained slightly greater than atmospheric pressure, it is necessary to seal the end walls 21 and 22 at their openings around the cables. Seal means are provided in the end walls for this purpose, but a detailed description of such means is reserved for inclusion in the description of the permanent case 12 of FIGURE 2.

When all wire connections have been made they are covered by a wrapping of suitable tape as shown at 52 in FIGURE 2.

The jacket of the permanent case 12 of FIGURE 2 is designated by reference numeral 54. It is tubular and fits snugly at its ends around the end walls 21 and 22. The jacket 54 is rigid and preferably formed of the same type of material as the end walls.

Figure 7:
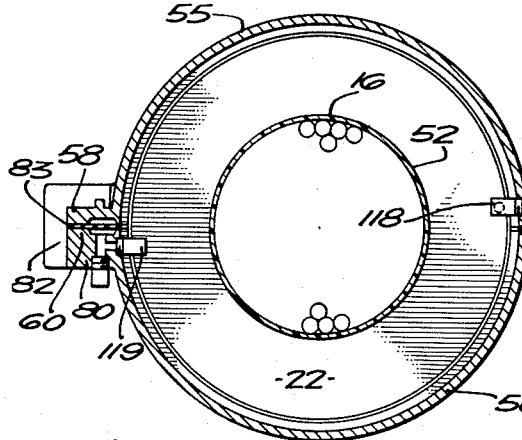
FIGURE 7 is a central cross-sectional on an enlarged scale through the permanent case of FIGURE 2.

Jacket 54 is separable along a central longitudinal plane into two half shells herein referred to as a top half 55 and a bottom half 56. They are identical to each other in size and construction. Top half 55 has two flanges 57 and 58 extending radially outward at opposite side edges to function jointly in closing the jacket with corresponding flanges 59 and 60 respectively, of the bottom half 56. There are two locking bars 62 and 63 of channel cross section for arrangement in end-to-end relationship and within which flanges 57 and 59 are seated. As best appears in FIGURES 2 and 7, flange 57 has an enlargement or boss 64 at its midportion, and the locking bars 62 and 63 are notched (at 66 in the case of bar 62) to accommodate the boss 64 with the bottom walls of the channel boss extending to a plane of abutment at 68. Flange 57 has a longitudinally extending ridge 70 which seats in a complementally shaped groove 71 in one side of the channel bar 62 to hold the bar against sliding radially outward from the flange, and flange 59 has a corresponding tongue or ridge 72 for mating in a groove in the other leg of that channel bar. When the two jacket halves 55 and 56 are arranged around the end walls 21 and 22 as shown in FIGURE 2, the locking bars 62 and 63 may be slid into their clamping positions over the pair of flanges 57 and 59 from opposite ends of the jacket to abutment at 68.

Flange 59 has a longitudinally extending recess 74 spaced inwardly from its ends and side edges, the marginal land surface which surounds the recess being designated by numeral 75. Flange 57 has a corresponding longitudinally extending recess 76. A flat seal strip 78 of elastomer material, e.g., rubber, is disposed between the flanges 57 and 59 to extend across the recesses 74 and 76, the seal strip being sandwiched between the land surfaces of the flanges. The mode of operation of the seal strip 78 corresponds to that of other seals to be presently described one of which is shown enlarged in FIGURE 6. The jacket half 56 being identical to that of the jacket half 55 but oriented in reverse position, it has an enlargement or boss 80 which appears in FIGURE 7. One of the locking bars for clamping the flanges 58 and 60 together appears in FIGURE 2 at 81 and the other in FIGURE 7 at 82. The elastomer seal strip for the flanges 58 and 60, corresponding to the seal strip 78, is designated by reference numeral 83.

Referring again to the end wall 21 and in particular to FIGURE 6 of the drawing, the wall has two annular ridges 84 and 85, the radially extreme surfaces of which define the periphery of the end wall. These ridges are spaced apart to define a recess 86 between them extending circumferentialy of the end wall. A port 88 in the end wall 21 is open to the recess 86 and to a cross bore or passage 89 extending through the end wall. Passage 89 is closed at its outer end by a check valve 100, and at its inner end by a check valve 101. Outer check valve 100 allows air under pressure, as from a hand pump (not shown), to the passage 89 and prevents air from escaping from the passage to the atmosphere. The inner check valve 101 prevents air within the passage 89 from flowing to the inside of the splice case and allows gas under pressure to flow from inside the splice case into the passage.

Figure 5:
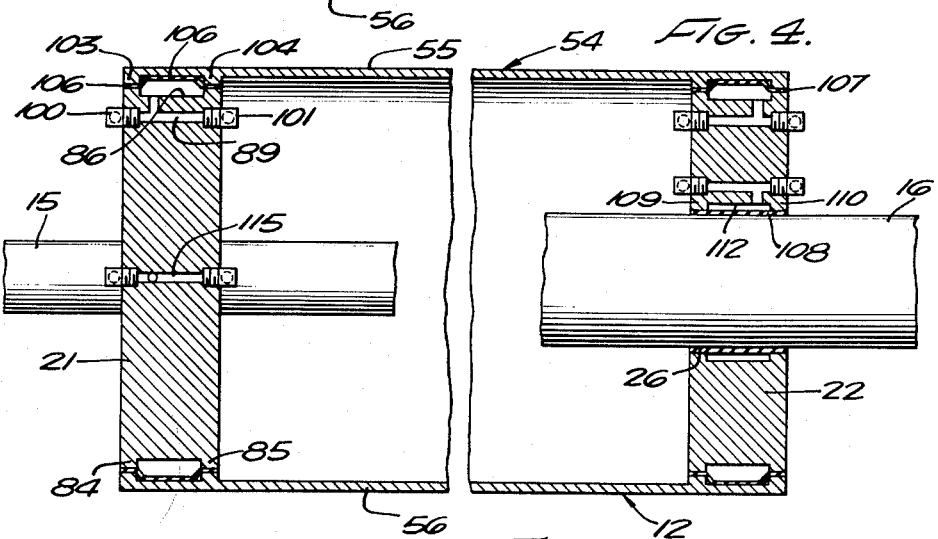
FIGURE 5 is a view corresponding to FIGURE 4 and showing the seal diaphragms in their expanded postions.

Permanent jacket 54 has two axially spaced ridges 103 and 104 on its inside, defining a recess 105 opposite the recess 86 in the end wall 21. An annular diaphragm or band 106 of elastomer material encircles the end wall 21 and spans the annular recesses 86 and 105. The band 106 is adhered as with a suitable adhesive to the outside circumferential surfaces of the end wall ridges 84 and 85 to secure the seal bond band fluent tight around the end wall. The jacket ridges 103 and 104 bear against the outside surface of the band 106 opposite the end wall ridges 84 and 85, respectively. When the splice case 12 is ready to be sealed, air is pumped into the passage 89 through the outside check valve 100 to expand the band 106 radially outward into sealing engagement against the bottom surface of the jacket recess 105 as appears in FIGURE 5. The jacket 54 is thus sealed around the end wall 21 against seeping of air from outside the splice case between the band 106 and the jacket. It is preferred to pressurize the recess 86 to a higher pressure than that within the splice case; however, should the pressure in the recess 86 tend to drop, the band 106 will still be maintained expanded against the bottom surface of the recess 105 by gas pressure from within the splice case entering through the inner check valve 101.

The end wall 22 has a seal means 107 which corresponds in structure and mode of operation to the above described peripheral seal for the end wall 21.

For its cable receiving opening 26, the end wall 22 has an inflatable seal arrangement including a circumferentially continuous diaphragm band 108 for sealing the end wall fluidtight around the outside surface of the sheath or the cable 16. Axially spaced ridges 109 and 110 which define a pressure recess 112 for the diaphragm 108 also serve to support the end wall 22 on the cable 16 against appreciable canting of the end wall.

Similarly the end wall 21 has two diaphragms 113 and 114 for its openings 23 and 24, respectively to seal and support the end wall 21 around the branch cables 14 and 15. Each of the diaphragms 113 and 114 has associated annular recesses for inflating the bands against the outside surfaces of their respective cables, there being a single passage 115 in the end wall 21 for pressurizing both seal bands 113 and 114.

Figure 8:
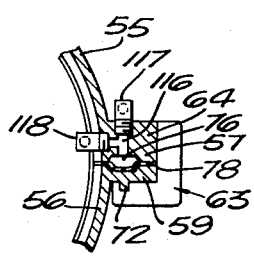
FIGURE 8 is a detail cross-section through one of the seals if FIGURE 7 in inflated condition.

Referring again to the side flanges 57 and 59 and to the diaphragm strip 78 between these flanges, it will be noted that the recess 76 in the flange 57 is pressurized to its sealing position shown in FIGURE 8 by a passage 116 formed in the boss 64 and closed by an outside check valve 117, the passage further leading to the inside the splice case through an inside check valve 118 which corresponds in its mode of operation to the inside check valve 101 previously described. The check valve of the jacket half 56 for the longitudinal seal which is diametrically opposite the seal 78 appears at 119 in FIGURE 2. The seal strips for the side flanges extend radially inward between the end walls 21 and 22 to engagement with the outside surfaces of the peripheral diaphragms 106 and 107.

When all seals of the permanent splice case 12 have been pressurized, they will prevent entry of moisture-laden air from the atmosphere to within the splice case. Each seal being in communication with the inside of the splice case, it will be apparent that should the pressure within any of the seal passages tend to drop, the pressure in such seal passage will be maintained to a pressure at least equal to that inside the splice case, the pressure within the splice case being maintained slightly above atmospheric pressure by dry gas supplied from within the sheaths of the cables.

While the particular splice cases herein shown and disclosed in detail are fully capable of attaining the objects and providing the advantages hereinbefore stated, it is to be understood that it is merely illustrative of the presently preferred embodiments of the invention and that no limitations are intended to the details of construction or design hereinshown other than as defined in the appended claims.

I claim:

1. An encased cable joint comprising two cable lengths spliced together, a wall of rigid material having inside and outside faces and having a peripheral surface and having an opening extending through the wall, one cable length extending through said wall opening, means for sealing the wall fluidtight around said one cable length, a circumferentially continuous elastomer diaphragm encircling the wall, the diaphragm having two side margins and a free portion between said margins, said margins being adhered to said peripheral surface, the wall having a passage open at one end to said free portion and extending to the outside face of said wall, a check valve in said passageway permitting flow of fluid in the passage in a direction from said outside face to said free portion and preventing flow of fluid in an opposite direction, a jacket enclosing the cable splice and having an end portion encircling said diaphragm margins and means for securing said jacket end portion tight around the diaphragm.

2. An encased cable joint according to claim 1 in which said jacket is a temporary jacket formed of flexible plastic material, and said securing means comprises a band clamp encircling said temporary jacket.

3. An encased cable joint according to claim 1 in which said jacket is formed of stiff material, said jacket being separable longitudinally thereof into two half portions, and said securing means comprising fasteners joining said half portions together.

4. Apparatus for weatherproofing a cable splice of two lengths of sheathed cable of numerous wires, the apparatus comprising two end walls, each wall having an opening for receiving respective cable lengths extending therethrough with the wall being generally perpendicular to the axis of the cable length, inflatable seal means in the wall for sealing the wall openings around the cable length, said means comprising two annular ridges of the wall and an annular recess between the ridges, the ridges and the recess defining said cable-receiving opening, and an annular elastomer band spanning said recess and adhered circumferentially to said ridges, the band being of a thickness to be in circumferentially continuous engagement with its respective cable length whereby the wall is supported on its cable length through the band against appreciable canting of the wall with respect to its cable length from said perpendicular positioning of the wall, the wall having a passage extending through it, a port interconnecting the passage and said recess, check valves in opposite ends respectively of said passage allowing fluid under pressure to be passed into said passage and preventing escape of fluid from the ends of said passage, whereby fluid pressure in said recess presses the band into sealing engagement with said cable, each wall having peripheral seal means comprising ridges, recess elastomer band, and valve controlled passage corresponding to elements respectively of said cable-receiving opening seal means, a tubular jacket adapted to circle said end walls, and means for clamping the jacket around said walls.

5. Apparatus for weatherproofing a cable splice of two lengths of sheathed cable of numerous wires, the apparatus comprising two end walls, each wall having an opening for receiving respective cable lengths extending therethrough with the wall being generally perpendicular to the axis of the cable length, inflatable seal means in the wall for sealing the wall openings around the cable length, said means comprising two annular ridges of the wall and an annular recess between the ridges, the ridges and the recess defining said cable-receiving opening, and an annular elastomer band spanning said recess and adhered circumferentially to said ridges, the band being of a thickness to be in circumferentially continuous engagement with its respective cable length whereby the wall is supported on its cable length through the band against appreciable canting of the wall with respect to its cable length from said perpendicular positioning of the wall, the wall having a passage extending through it, a port interconnecting the passage and said recess, check valves in opposite ends respectively of said passage allowing fluid under pressure to be passed into said passage and preventing escape of fluid from the ends of said passage, whereby fluid pressure in said recess presses the band into sealing engagement with said cable, each wall having peripheral seal means comprising ridges, recess, elastomer band, and valve controlled passage corresponding to elements respectively of said cable-receiving opening seal means, and a permanent jacket adapted to enclose a completed cable splice and to surround said end walls, said elastomer bands of said perpheral seal means being inflatable into sealing engagement against the inside surface of said permanent jacket.

6. Apparatus according to claim 5 in which said permanent jacket is split longitudinally thereof into two halves, each half having flanges along its longitudinal edges respectively, providing two diametrically opposite pairs of flanges, means for clamping the flanges of each pair together, each pair of flanges having an elastomer strip between the flanges, the strip being adhered to one flange, and passage means in said one flange for inflating the strip into tight sealing contact against the other flange.

7. A cable splice jacket assembly comprising, a pair of rigid end rings having openings for snugly receiving the ends of lead sheathed cable having conductors to be be spliced together, said openings and the rims of said end rings having inflatable sealing gaskets, generally tubular jacket means being assembled about the peripheral rims of said end rings and cooperating therewith to form a fluid-tight enclosure for said cable splice, and means for charging the interior of the splice jacket so formed with gas under pressure and means for inflating said inflatable sealing gaskets.

8. A jacket assembly as defined in claim 7 characterized in that said tubular jacket means comprises impervious flexible sheet material having a fluid-tight seam extending lengthwise thereof.

9. A jacket assembly as defined in claim 8 characterized in the provision of band means encircling the opposite ends of said tubular jacket and encircling the same opposite the rims of said end rings to restain and limit expansion of the associated ones of said inflatable gaskets.

10. A jacket assembly as defined in claim 7 characterized in that said tubular jacket means includes a pair of semi-circular rigid cover members having flanges extending lengthwise of their lateral edges, said cover members being seatable against the rims of said end rings with their flanges in close abutting relationship, and inflatable gaskets between said abutting flanges, means for charging said inflatable gaskets with fluid under superatmospheric pressure, and means for holding said cover members in assembled position against the rims of said end rings.

11. A jacket assembly as defined in claim 10 characterized in that said means for holding said cover members assemblied to said end rings comprises channel-shaped members shaped to be telescoped over each pair of abutting flanges from the outer ends of said flanges.

12. In combination, a cable splice jacket assembly comprising a pair of rigid end rings having openings through their center areas for the juxtaposed ends of sheathed cabling to be spliced, a tubular cover for said splice formed in two semicyclindrical halves each provided with flange means projecting outwardly from their opposite lateral edges positioned to abut one another when said cover members are seated against the rims of said end rings, and a plurality of long channel-shaped rigid keeper members embracing each abutting pair of said flange means and cooperating to hold said cover members snugly assembled to said end rings, said rigid keeper members being sized to embrace and substantially enclose said abutting flanges snugly, and gasket means encircling the rims of said end rings and between the abutting surfaces of the flanges of said cover members and cooperating therewith to form a fluid-tight jacket assembly.

13. A jacket assembly as defined in claim 12 characterized in that said gasket means are inflatable with pressurized fluid, and valved charging means for said inflatable gasket means by which the same can be charged with fluid.

References Cited by the Examiner
UNITED STATES PATENTS

| | | |
|---|---|---|
| 1,977,774 | 10/34 | Osborne. |
| 2,788,385 | 4/57 | Doering _____ 174—92 |
| 3,054,849 | 9/62 | Colbert _____ 174—5 X |
| 3,068,013 | 12/62 | Calendine et al. |

DARRELL L. CLAY, *Primary Examiner.*

JOHN P. WILDMAN, JOHN F. BURNS, E. JAMES SAX, *Examiners.*